United States Patent
Hollis et al.

(10) Patent No.: US 6,628,766 B1
(45) Date of Patent: Sep. 30, 2003

(54) APPARATUS FOR DELIVERY OF PREPAID TELECOMMUNICATION SERVICES AND METHOD THEREFOR

(75) Inventors: Nicolas Stanley Ashworth Hollis, San Antonio, TX (US); John Rex Powell, Ocean City, NJ (US)

(73) Assignee: Intelepaid.com, Inc., San Antonio, TX (US)

( * ) Notice: Subject to any disclaimer, the term of this patent is extended or adjusted under 35 U.S.C. 154(b) by 0 days.

(21) Appl. No.: 09/280,438

(22) Filed: Mar. 29, 1999

(51) Int. Cl.[7] .................. H04M 15/00; H04M 17/00
(52) U.S. Cl. .................. 379/114.2; 379/144.05; 379/144.04
(58) Field of Search .................. 379/114, 144, 379/91.01, 112, 114.01, 114.2, 114.19, 114.03, 114.05, 114.12, 114.15, 114.16, 114.17, 144.01, 144.05, 144.07, 144.08, 144.04; 705/40, 41

(56) References Cited

U.S. PATENT DOCUMENTS

| | | | |
|---|---|---|---|
| 5,696,829 A | | 12/1997 | Cordery et al. |
| 5,696,908 A | * | 12/1997 | Muehlberger et al. ...... 379/114 |
| 5,719,926 A | * | 2/1998 | Hill .............................. 379/113 |
| 5,721,768 A | | 2/1998 | Stimson et al. |
| 5,749,075 A | | 5/1998 | Toader et al. |
| 5,774,533 A | * | 6/1998 | Patel ........................... 379/127 |
| 5,777,305 A | | 7/1998 | Smith et al. |
| 5,796,841 A | | 8/1998 | Cordery et al. |
| 5,805,711 A | | 9/1998 | Windel et al. |
| 5,806,043 A | * | 9/1998 | Toader ......................... 705/14 |
| 5,825,863 A | * | 10/1998 | Walker ......................... 379/144 |
| 5,835,689 A | | 11/1998 | Braun et al. |
| 5,850,446 A | | 12/1998 | Berger et al. |
| 5,868,236 A | * | 2/1999 | Rademacher ................ 379/144 |
| 5,903,633 A | * | 5/1999 | Lorsch ......................... 379/114 |
| 5,991,381 A | * | 11/1999 | Bouanaka et al. ........... 379/115 |
| 6,047,268 A | * | 4/2000 | Bartoli et al. ................ 379/114 |
| 6,081,791 A | * | 6/2000 | Clark ........................... 705/43 |
| 6,256,614 B1 | * | 7/2001 | Wecker et al. ................ 705/14 |
| 6,370,514 B1 | * | 4/2002 | Messner ....................... 705/14 |
| 6,526,130 B1 | * | 2/2003 | Paschini .................. 379/93.12 |

FOREIGN PATENT DOCUMENTS

IT    WO 98/59455    * 12/1998

OTHER PUBLICATIONS

Jonathan B. Postel: Simple Mail Transfer Protocol; Aug., 1982: 47 pages.
Personal Communications Industry Association; Telocater Data Paging (TDP) Protocol Specifications; Jun. 10, 1997; 129 pages.
Personal Communications Industry Association;PCIA Protocol Specifications—Agreement; 1997; 2 pages.

* cited by examiner

Primary Examiner—Rexford Barnie
(74) Attorney, Agent, or Firm—Barry S. Newberger; Ross Spencer Garsson Winstead Sechrest & Minick P.C.

(57) ABSTRACT

An apparatus for delivery of prepaid telecommunication services and method therefor in which in substantially real time after a request for such services is submitted by a purchaser, the request is processed, a PIN number is issued for that particular service, and the prepaid telecommunication service is accessible. The PIN number can be transmitted to the purchaser or a third party recipient for whom the request for services was made. This transmittal includes incorporating the PIN number in an electronic mail message (for sending on a data processing network such as the Internet).

25 Claims, 8 Drawing Sheets

|  304  |  | 306  |  | 308  |  |  | 310 |  |
|---|---|---|---|---|---|---|---|---|
| 302 PIN 1A | 312 | 302 PIN 1B | 312 | 302 PIN 1C | 312 | ....... | 302 PIN 1N | 312 |
| 302 PIN 2A | 312 | 302 PIN 2B | 312 | 302 PIN 2C | 312 | ....... | 302 PIN 2N | 312 |
| 302 PIN 3A | 312 | 302 PIN 3B | 312 | 302 PIN 3C | 312 | ....... | 302 PIN 3N | 312 |
| . . . . . | . . . . . | . . . . . | . . . . . | . . . . . | . . . . . | . . . . . | . . . . . | . . . . . |
| 302 PIN MA | 312 | 302 PIN MB | 312 | 302 PIN MC | 312 | ....... | 302 PIN MN | 312 |

| 352 | 354 | 356 |  | 358 |
|---|---|---|---|---|
| Last_PIN A | Last_PIN B | Last_PIN C | .......... | Last_PIN N |

APPARATUS FOR DELIVERY OF PREPAID TELECOMMUNICATION SERVICES AND METHOD THEREFOR

TECHNICAL FIELD

The present invention relates in general to information handling systems, and in particular, to the electronic delivery of access to prepaid telecommunication services.

BACKGROUND INFORMATION

The use of prepaid telephone cards to access telecommunication services is becoming increasingly popular. The cards are typically sold in denominational amounts, and permit the purchaser to use telecommunication services, in the aggregate, up to the prepaid denominational amount.

The purchaser accesses telecommunication services provided by the issuer of the card by dialing a telephone number provided on the card. Additionally, each card bears a personal identification number (PIN) that the user enters in order to authorize access, and that is used by the issuer of the card to debit a corresponding account by the value of the telephone services used on each access. (Although described herein in terms of an issuer that is also the service provider, the card issuer and provider need not be the same entity. The issuer may contract with a third-party telephone service provider to provide the services accessed by the user of the card.)

There are risks and inconveniences associated with the physical card. Vendors of the cards must purchase the cards in bulk from the issuer, and, hence, provide for secure storage and handling of the cards prior to their resale. Moreover, the cards are small and thus easily subject to theft. From the perspective of the user, the imprinted PIN on the card grants the holder access to "banked" telephone service resources, and thus there is a risk to him or her associated with loss of the card. Additionally, inconvenience arises if a purchaser is seeking to acquire prepaid service on behalf of a third-party beneficiary. The purchaser first must go to a vendor and obtain the physical card, and then transfer the card to the third-party. For example, a parent might wish to acquire prepaid telephone services for a student living away from home, in lieu of sending the student an equivalent amount in cash. The card has to be acquired and then mailed to the student, and then when the card is exhausted, repeat the process.

Thus, there is a need in the art for a mechanism to distribute access to prepaid telecommunication services that reduces the exposure to loss, and reduces the handling and storage burden associated with physical cards. Additionally, there is a need for a distribution mechanism that facilitates the purchase of prepaid telecommunication services for a third-party beneficiary.

SUMMARY OF THE INVENTION

The aforementioned needs are addressed by the present invention.

Accordingly there is provided an apparatus for delivery of prepaid telephone services and method therefor in which in substantially real time after a request for such services is submitted by a purchaser, the request is processed, a PIN number is issued for that particular service, and the prepaid communication service is accessible. As used herein, "substantially real time" reflects the inherent and latent delays caused by the transmission media. There is further provided an apparatus and method for transmitting the PIN number to the purchaser or a third party recipient for whom the request for services was made. This transmittal includes incorporating the PIN number in an electronic mail message (for sending on a data processing network such as the Internet).

The present invention has an advantage of allowing a purchaser to purchase the service using an interface, such as a computer terminal, a kiosk, or a ATM machine, to submit the request. Such an interface can allow the request to be made by utilizing the World Wide Web. By incorporating these in such interface, the present invention allows the recipient to have substantially real time access to such services, as opposed to the prior art. Such access includes the ability to use the PIN number by a telephone or other telecommunication medium wholly independent of the interface.

The present invention further has an advantage of alleviating the need for physical cards with unique PIN numbers to be maintained, which physical cards are subject to shrinkage due to theft or loss. Because the purchase price for the service includes the recovery cost due to this shrinkage problem, the overall cost to purchase these services should be reduced.

The present invention has a further advantage of allowing an entity to enable such service to users of its telecommunications systems without the need for the entity to pre-purchase the services. Rather, the entity will have the capability to purchase the service for its users if and when the need arises.

The present invention has a further advantage of ease of use for the purchaser. For instance, the purchaser can "swipe" its credit card (or other payment card) in a reading device to submit request and receive its PEN number on the receipt that issues therefrom.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Mechanisms for the distribution of prepaid telephone service access are provided. The mechanisms transmit information signals representing a virtual telephone card via a communication network, which may be a data processing network, such as a local area network (LAN), wide area network (WAN) or a worldwide network, such as the Internet, the proposed Internet 2, or similar network, to a purchaser. The virtual telephone card is sent in response to user-provided payment information, which may be sent by a purchaser's Web client (e.g. a personal computer equipped with a Web browser) to a Web server implementing the mechanisms of the present invention. An embodiment of the present invention provides that a virtual telephone card may be transmitted to a third-party beneficiary by, for example, electronic mail (e-mail) by election of the purchaser.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Although the present invention and its advantages have been described in detail, it should be understood that various changes, substitutions and alterations can be made herein without departing from the spirit and scope of the invention as defined by the appended claims.

Figure 1:
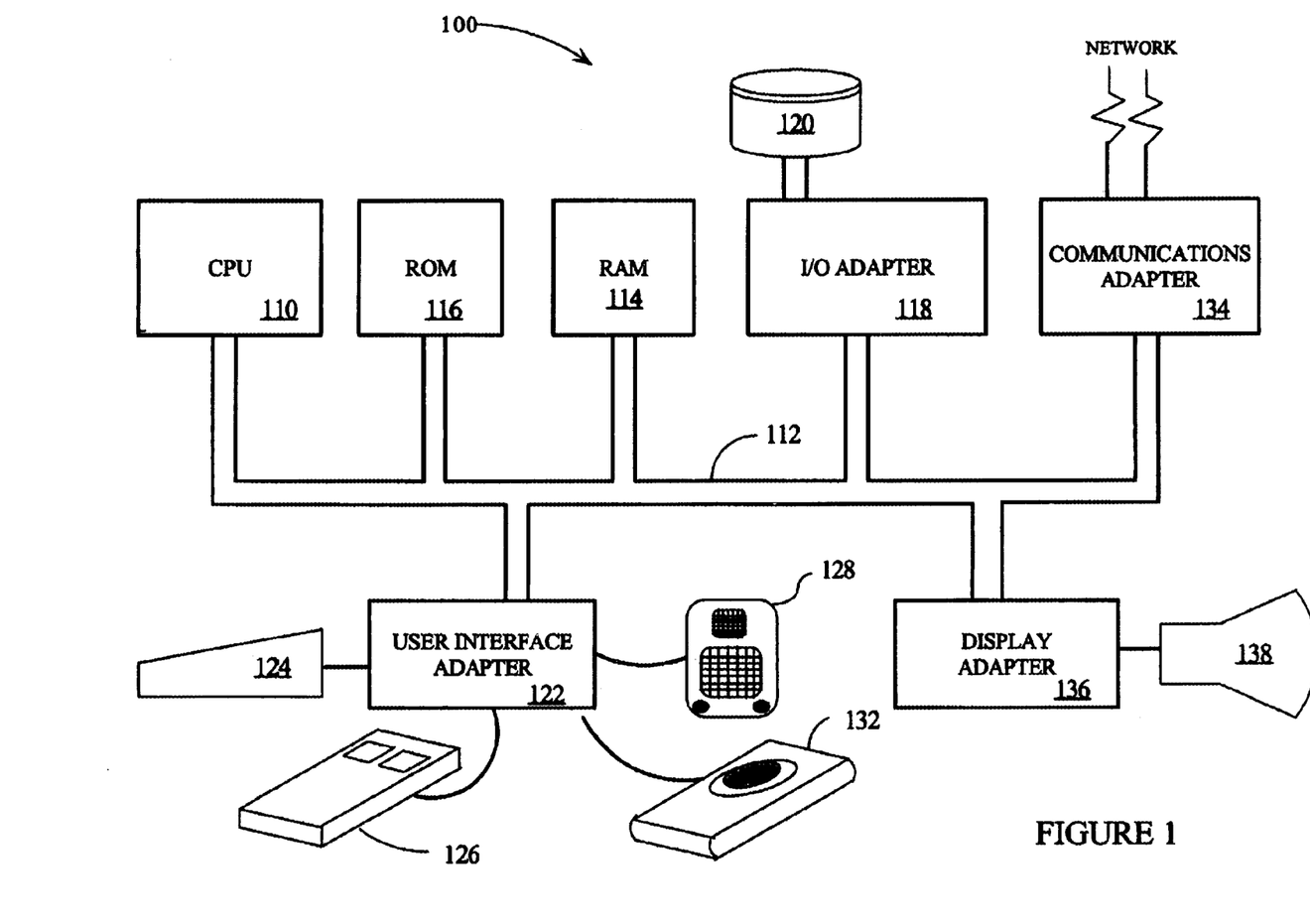
FIG. 1 illustrates, in block diagram form, a data processing system in accordance with an embodiment of the present invention.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI") adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126 and speaker 128 are all interconnected to bus 112 via user interface adapter 122. Display monitor 138 is connected to system bus 112 by display adapter 136. In this manner, a user is capable of inputting to the system throughout the keyboard 124, trackball 132 or mouse 126 and receiving output from the system via speaker 128 and display 138.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
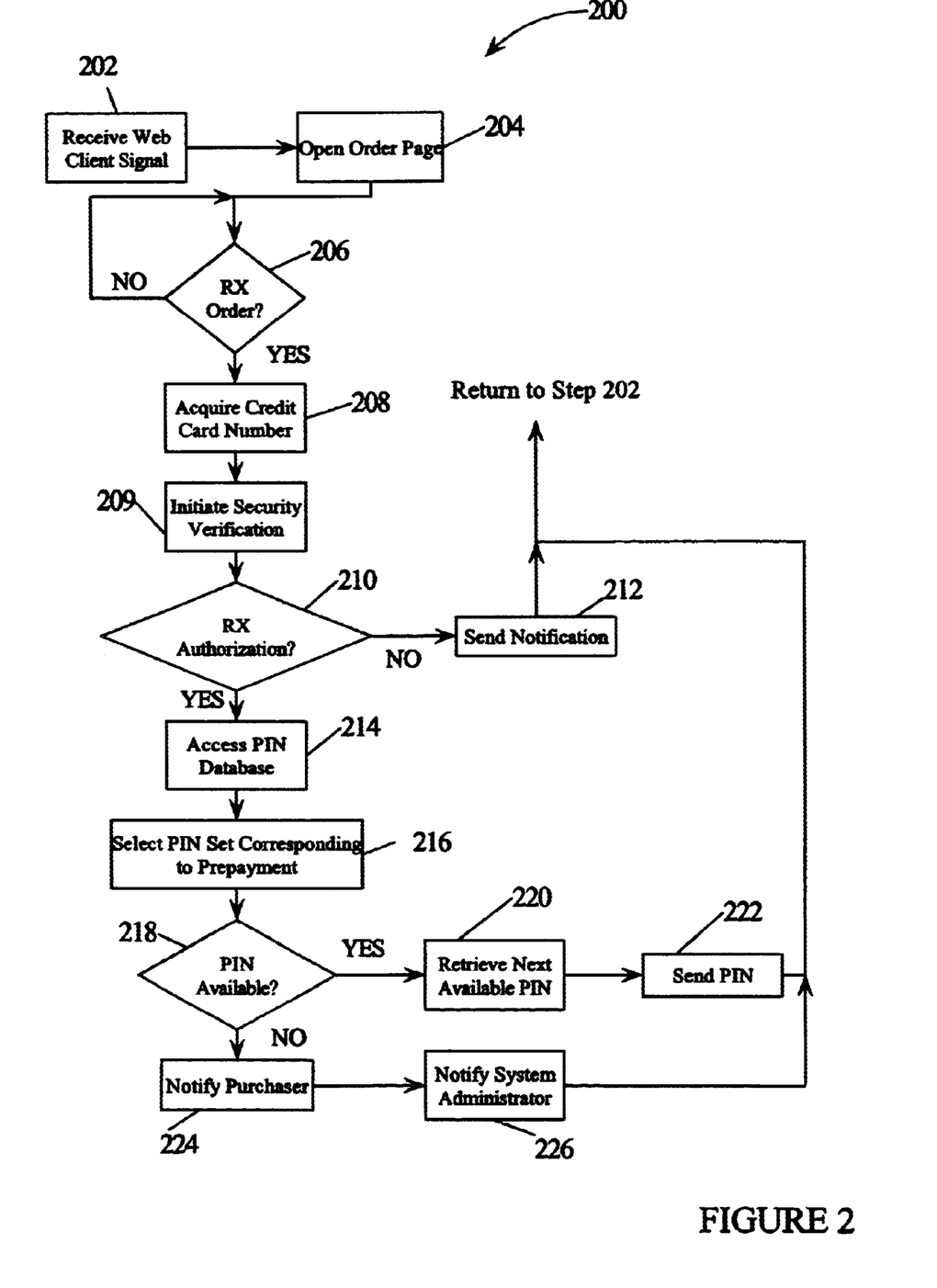
FIG. 2 illustrates, in flow chart form, a distribution methodology in accordance with an embodiment of the present invention.

Refer now to FIG. 2 illustrating, in flow chart form, delivery methodology 200 in accordance with an embodiment of the present invention. Methodology 200 initiates, in step 202, on receipt of a signal from a Web client addressed to a data processing system, such as data processing system 100 in FIG. 1, performing the steps of methodology 200. (A Web client may be a personal computer running a "web browser" that interfaces to the World Wide Web, a hypertext information and communications systems used on the Internet.) In response to the signal received in step 202, an order page is opened in step 204. Then, in step 206, methodology 200 waits until order information signals are received from the Web client. Included in the order information data stream is payment information, in particular, in an embodiment of the present invention in accordance with methodology 200, a credit card or other payment card number. (Payment cards may include credit cards, ATM or other debit cards and smart cards. However, it would be understood by an artisan of ordinary skill, that other similar "cards" may be used with the present invention.). In step 208, a payment card number is acquired, and in step 209 a security verification is initiated with the issuer of the payment card to determine the validity thereof. In step.210, methodology 200 waits for authorization to be received.

If verification fails in step 210, a notification is sent in step 212 and methodology 200 returns to step 202. The notification information sent in step 212 may include a message indicating that the payment card number was not accepted. The purchaser may then elect to use a different payment card, and on returning to step 202, methodology 200 affords the purchaser another opportunity to reinitiate the transaction.

Figure 3A:
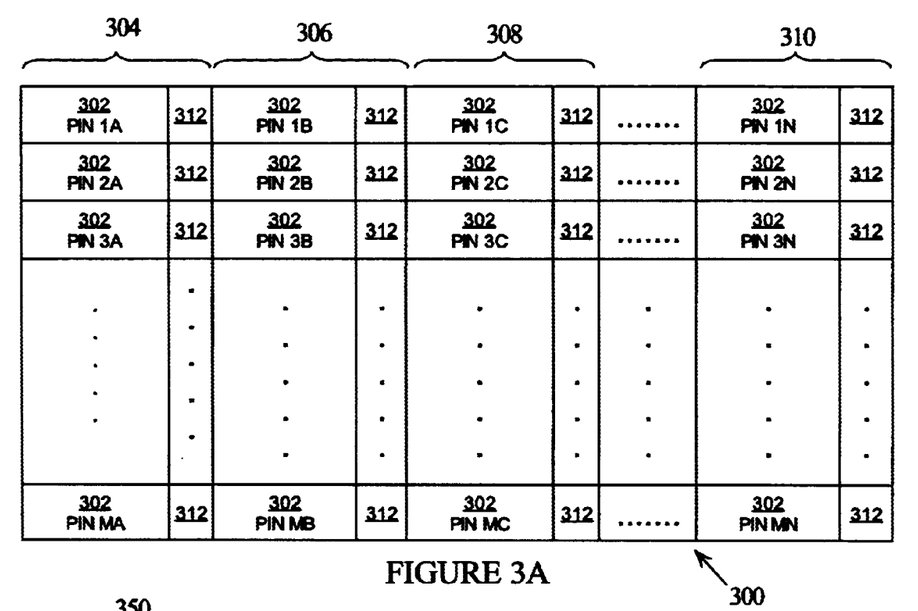
FIG. 3A schematically illustrates a PIN database in accordance with an embodiment of the present invention.

If, however, in step 210 authorization is received, a PIN database is accessed in step 214. An embodiment of a PIN database is illustrated in FIG. 3A. Database 300 includes a plurality of entries 302, each of which is operable for storing a predetermined PIN. Entries 302 are arranged in a plurality, N, of sets 304–310. Each set of PINs represented thereby corresponds to a predetermined prepayment amount, representing a value of the prepaid telephone services that may be accessed. Each of the entry sets 304–310 includes a plurality, M, of entries 302. Thus, within each prepayment amount category, M, a PIN may be issued before database 300 needs to be updated.

Returning to FIG. 2, in step 216 a one of sets 304–310 corresponding to a purchaser-chosen prepayment amount is selected. Order information signals received in step 206 include the prepayment amount chosen by the purchaser. This information is also passed to the payment card issuer, in step 209, in order that the verification process implemented by the issuer may be effectuated. For example, if the user-chosen prepayment amount would cause a credit limit to be exceeded, authorization would be denied, in step 210 above. Additionally, the prepayment amount information sent to the payment card issuer in step 209 permits the purchaser's payment card account to be debited accordingly, if authorization is granted.

Figure 3B:
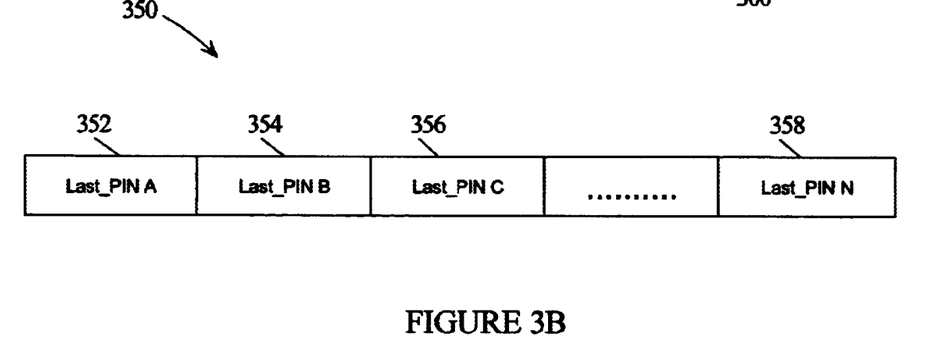
FIG. 3B schematically illustrates a PIN tracking mechanism in accordance with an embodiment of the present invention.

In step 218, it is determined if a PIN within the set selected in step 216 is available for issuing. If so, in step 220 the next available PIN is retrieved from the corresponding one of entries 302 in database 300, FIG. 3A, and marked. Marking the PIN may be by storing the PIN in data structure 350, FIG. 3B, having a plurality of entries 352–358 corresponding to each of the set 304–310. The retrieved PIN is stored in the entry corresponding to the set from which it was obtained. On retrieving a PIN in step 220, methodology 200 may refer to data structure 350 to determine a last issued PIN and select the next PIN in database 300 accordingly. Alternatively, each entry 302 in database 300 may have an associated portion 312 for storing a tag which may be set when the corresponding PIN is retrieved. Methodology 200 then accesses portion 312 to obtain an "untagged" PIN, that is a PIN corresponding to an untagged portion 312. It would be understood by an artisan of ordinary skill such embodiments, as well as equivalent tagging mechanisms, would be within the spirit and scope of the present invention. In step 222 the PIN retrieved in step 220 is transmitted to the purchaser. Additionally, a telephone number for accessing the prepaid telephone services acquired by the purchaser may also be transmitted to the purchaser in step 222. Methodology 200 then returns to step 202.

On receipt of the PIN information signals and telephone number signals sent in step 222, the purchaser's client processor will display the PIN and the telephone number. The purchaser may elect to print a copy of the virtual phone card displayed on the purchaser's video screen. However, the PIN is not bound with the physical card, and the security, or protection, of the PIN lies entirely with the purchaser who is free to take whatever measures the purchaser feels adequate to protect himself or herself against loss of the value acquired. For example, the purchaser may choose to carry a physical copy only of the PIN, and not the telephone access number, or, alternatively, the PIN and the telephone number may be carried separately by the user. Additionally, unlike a physical card, the virtual card may be stored on the user's hard disk or on a floppy disk, and the user is thereby protected against loss of the card which, with the physical card, would deny the purchaser access to the prepaid telephone services he or she has purchased.

Referring to step 218, if no PIN corresponding to the selected prepayment amount is available, the purchaser may be notified in step 224. The notification signals sent in step 224 may include information indicating that the prepayment amount chosen is currently unavailable, and suggesting that the purchaser choose a different amount of prepaid services. Additionally, in step 226, information signals are sent to the system administrator notifying the administrator to acquire additional PINs corresponding to the prepayment amount for which PINs are unavailable, and to update the database therewith. Methodology 200 then returns to step 202. If, the user chooses to select a new prepaid amount, in response to the signal sent in step 224, methodology 200 may then be reinitiated in response to signals received in step 202.

Figure 4:
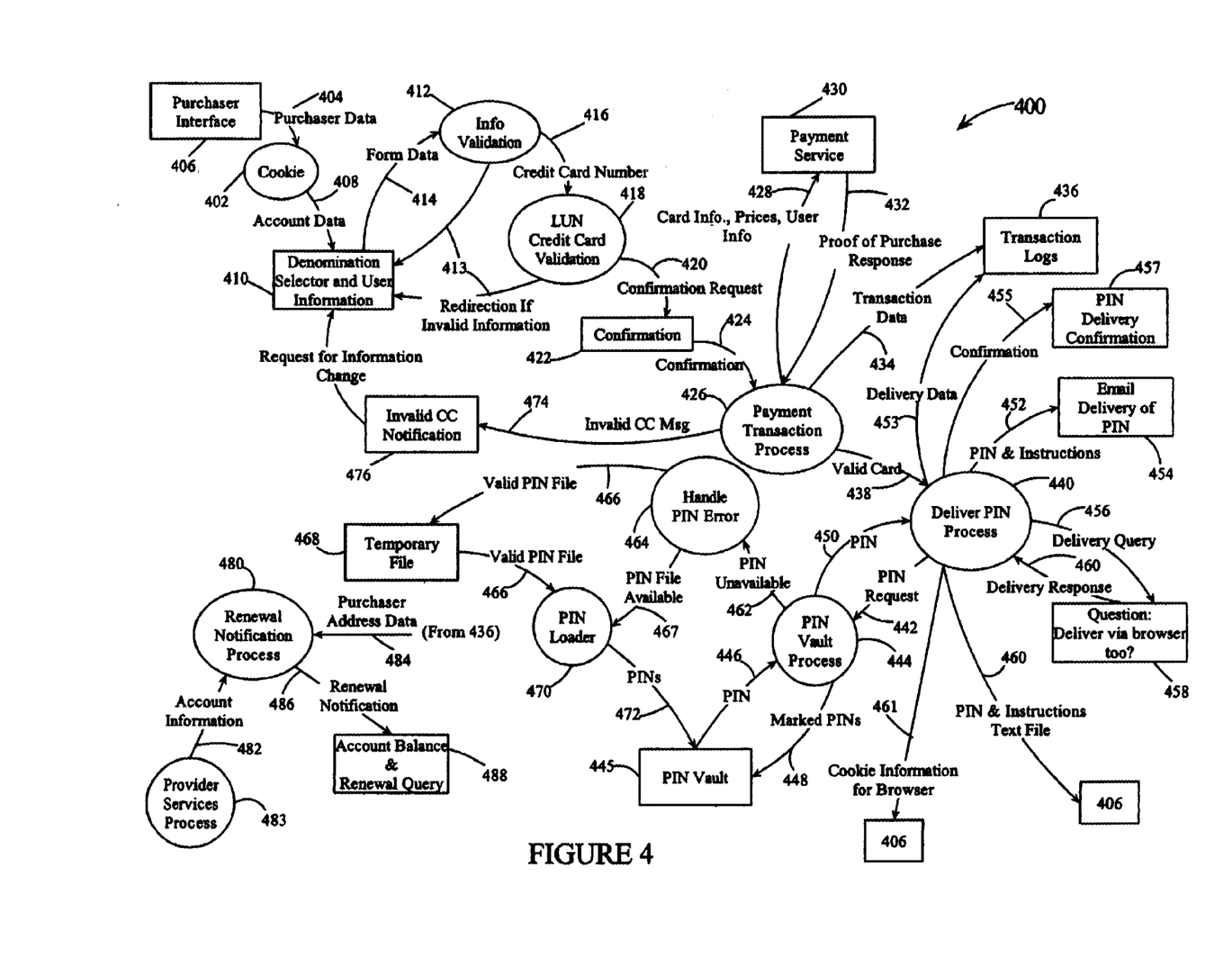
FIG. 4 illustrates, in data flow diagram form, a distribution methodology in accordance with an alternative embodiment of the present invention.

Referring now to FIG. 4, there is illustrated therein, in data flow diagram form, a delivery methodology 400 in accordance with another embodiment of the present invention. "Cookie" process module 402 receives purchaser data 404, from the purchaser's communication interface software 406. In the WWW context, this software 406 may be a web browser. More generally, interface software 406 may be software implementing a network communication protocol, such as TCP/IP, a known protocol for network communication, or other communication protocol for wired or wireless transmission of information. (TCP/IP is defined in Request For Comments (RFC) 791 and 793, which are hereby incorporated herein by reference.) If the purchaser has previously purchased prepaid telephone services, process module 402 sends account data 408 received in purchaser data 404, to a denomination selector and user information form 410 displayed on purchaser's data processing system. Additionally, in an embodiment of the present invention, interface software 406 may be incorporated in a device such as a payment card reader. In such an embodiment, purchaser data 404 may not include "cookie" information. In this embodiment, data 404 may be communicated in communication protocols, or a subset thereof, such as the American National Standards Institute (ANSI) X.12 protocols, or the Electronic Data Interchange for Administration Commerce and Trace (EDIFACT) protocols developed by the International Standards Organization (ISO) However, it would be understood by an artisan of ordinary skill that other protocols which may be known in the electronic commerce ("e-commerce") art, may also be used. It would be further understood that in a communication channel having a plurality of segments, for example, a wired channel transporting information signals to and from wireless gateway may include multiple communication protocols (wireless protocols are discussed below), with translation being performed at interfaces between segments. Such embodiments would be within the spirit and scope of the present invention.

Information validation module 412 receives the purchaser information data signals 414, and determines if the information is valid. For example, process module 412 determines if required data is missing from form data 414. If form data 414 includes invalid information, information validation process 412 sends a redirection message 413 returning the purchaser's browser to the user information display 410. Additionally, information validation process 412 passes the purchaser's payment card number 416 to LUN payment card validation process 418.

Payment card validation process 418 determines if payment card number 416 satisfies the LUN algorithm, an industry standard protocol for specifying a set of arithmetic checks that valid payment card numbers will satisfy. The LUN validation process 418 does not determine if the purchaser's payment card account has sufficient funds or is otherwise valid, but does detect, for example, if the payment card number has been corrupted in the data transmission process. If process 418 determines that payment card number 416 does not satisfy the LUN validation, redirection signal 413 is sent back to the purchaser's Web browser, causing user information page 410 to be displayed.

If LUN verification process 418 determines that payment card number 416 satisfies the LUN test, a confirmation request 420 is sent to the purchaser's Web browser. In response, confirmation page 422 is displayed, and the user sends confirmation signal 424, which is received by payment transaction process 426.

Payment transaction process 426 interfaces with a third-party payment handling service. Payment transaction process 426 sends transaction information signals 428 to payment service 430. In an embodiment of the present invention, payment service 430 may be the CyberCash™, provided by CyberCash, Inc. Payment transaction process 426 then receives proof of purchase signals 432 from payment service 430. Included in proof of purchase signals 432 are information signals informing payment transaction process 426 that the purchaser's payment card account is valid. In response, payment transaction process 426 sends transaction data 434 for inclusion in a transaction log database 436. Additionally, payment transaction process 426 sends a card valid signal 438 to PIN delivery process 440.

PIN delivery process 440 then issues PIN request signal 442 to PIN vault process 444. PIN vault process 444 interacts with PIN vault 445, a database containing a plurality of PIN numbers, such as database 300, FIG. 3A. As in delivery methodology 200, FIG. 2, discussed hereinabove, sets of PINs are associated with denominational amounts of services offered to the purchaser. PIN vault process 444 locks PIN vault 445 until a current pending PIN access is completed, in order that the same PIN number not be issued in response to a subsequent request. PIN 446 is retrieved from PIN vault 445, and marked by PIN vault process 444. Marked PIN 448 is returned to PIN vault 445. For example, a tag portion, as described in conjunction with FIG. 3A may be included in PIN vault 445, however, it would be understood by an artisan of ordinary skill that other tagging mechanisms may be used, and would be within the spirit and scope of the present invention. PIN vault process 444 returns the PIN to delivery process 440.

PINs are delivered by process 440. In FIG. 4, process 440 delivers the PIN and instruction signals 452 to a standard electronic mail (e-mail) protocol 454, which may be the Simplified Mail Transfer Protocol (SMTP). (The SMTP is a known protocol for the transfer of mail over a network and is described in RFC 821, hereby incorporated herein by reference.) Instruction signals 452 may include information on accessing said predetermined telecommunication signals. The information may contain a toll-free telephone number, for example.

Although the process has been illustrated in FIG. 4 in terms of delivery via e-mail, alternative embodiments may deliver the PIN via any communications channel capable of transporting numeric or alphanumeric data. Such a channel may be wired or wireless, or a combination thereof. For example, the PIN may be communicated via a network to a wireless gateway, then over the wireless communication channel to a wireless modem in a personal computer or personal digital assistant (PDA). Alternatively, the PIN may be delivered via the wireless channel to an alphanumeric pager or a PCS or GMS telephone, for example. Protocols for wireless delivery of data, such as the PIN, are known in the art. One such which may be used in the present invention for transmitting PINs to a laptop or other personal computer, PDA or paging device is the Telocator Data Paging (TDP) Suite of Protocols, as described in the TDP Protocol Specification©, published by the Personal Communication Industries Association, which is hereby incorporated herein by reference. It would be understood, however, by an artisan of ordinary skill in the art that other protocols suitable for sending numeric or alphanumeric data would be within the spirit and scope of the present invention. Additionally, a payment card receipt printer may be the medium by which the PIN is provided to the recipient. In such an embodiment, data transfer in accordance with a standard communication protocol in the e-commerce art, or subset thereof, may be used in the present invention.

Process 440 may also send a confirmation message 455 to the purchaser's browser causing the browser to display a delivery confirmation 457. Thus, a purchaser who is acquiring prepaid telephone services on behalf of a third-party recipient receives a confirmation that a PIN has been delivered to the third party recipient. Additionally, delivery process 440 sends delivery query signal 456 to the purchaser's browser, causing the interface software to display a delivery query 458. Delivery process 440 receives a delivery response signal 460. If purchaser has requested delivery via the interface software delivery process 440 sends PIN and instruction text file formatted signals 460 to the purchaser's communication interface software 406.

Process 440 also sends cookie information 461 to the purchaser's communication interface software 406. Returning now to PIN vault process 444, if process 444 determines that a PIN corresponding to the purchaser's amount of prepaid telephone services requested is unavailable, PIN unavailable signal 462 is sent to PIN error handler process 464. Process 464 will be discussed further in conjunction with FIGS. 5 and 6 below. In response to the PIN unavailable signal 462, a validated PIN file 466 is returned by PIN error handling process 464, which may be stored in a temporary file location 468. Additionally, PIN error handling process 464 informs PIN loader process 470 via PIN file available signal 467 that validated PIN file 466 is available to the PIN loader in temporary storage 468. PIN file signals 466 may be in fixed-width ASCII format. PIN loader 470 may then retrieve PIN file 466 from temporary file storage 468, and load PINs 472 into PIN vault 445.

Methodology 400 may also notify the purchaser when the amount of services remaining drops below a predetermined threshold. Renewal notification process 480 receives purchaser ID data 482 from the telecommunication services provider process 483. Process 483 will be discussed further in conjunction with FIG. 8, below. Process 480 then accesses transaction log 436 and retrieves purchaser address data 484. Process 480 then transmits renewal notification message 486 which provides the purchaser (and recipient, if different) service balance information and renewal query 488. It would be understood by an artisan of ordinary skill that notification 486 may be sent to the services purchaser and services recipient (if different) via the same communications channels discussed hereinabove with respect to PIN delivery process 440.

Figure 5:
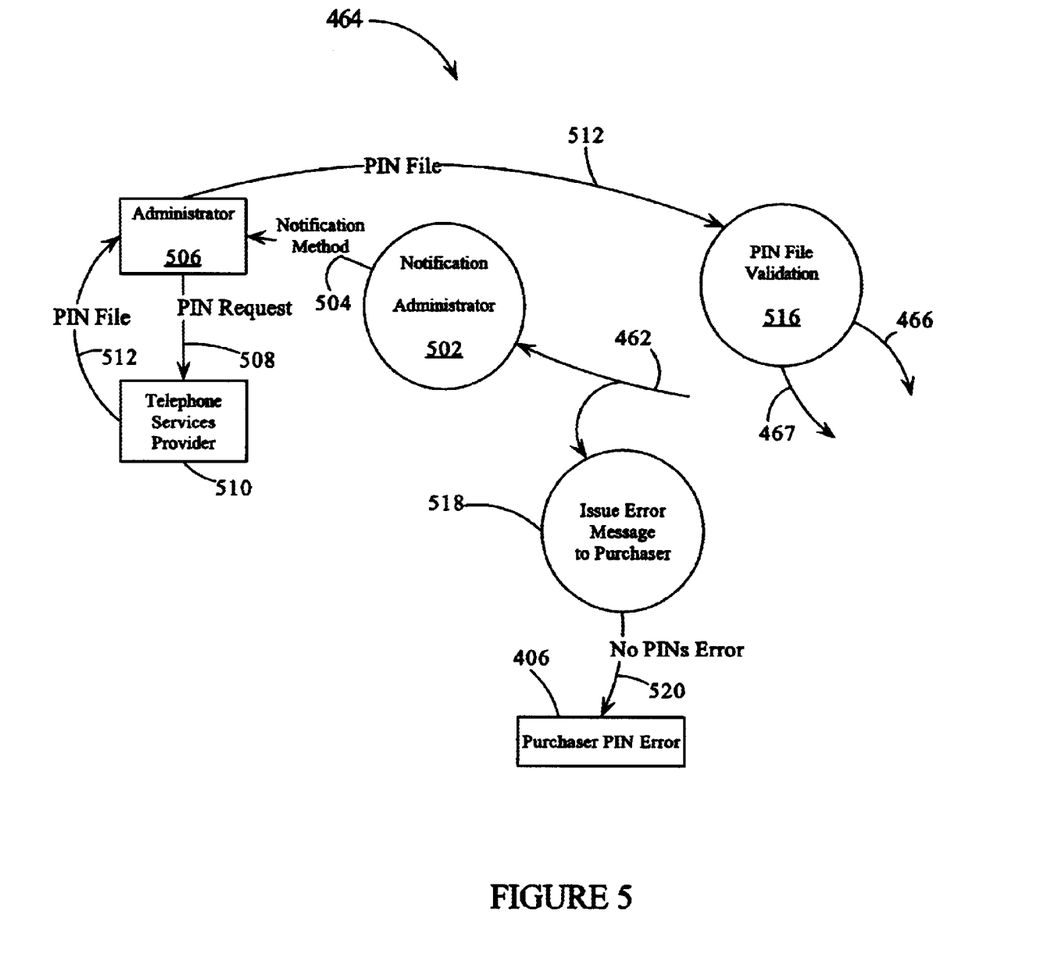
FIG. 5 illustrates, in data flow diagram form, a portion of a distribution methodology in accordance with one embodiment of the methodology of FIG. 4.

Refer now to FIG. 5 illustrating, in data flow diagram form, an embodiment of PIN error handling process 464 in further detail. PIN unavailable signal 462 is received by administrator notification process 502. In response, notification process 502 sends a notification message 504 to a system administrator 506. The system administrator 506 then sends a PIN request 508 to telephone services provider 510. Telephone services provider 510 generates PIN file 512 which is sent to administrator 506. Administrator 506 uploads PIN file 512 to PIN file validation process 516. PIN file validation process 516 ensures that PIN file 512 is in the proper format and that the file has not been corrupted during the file transfer. If the PIN file is valid, validation process 516 sends valid PIN file data signals 466 to the temporary file storage 468, as previously described. Additionally, PIN file validation process 516 sends PIN file available signal 467 to PIN loader 470.

Figure 6:
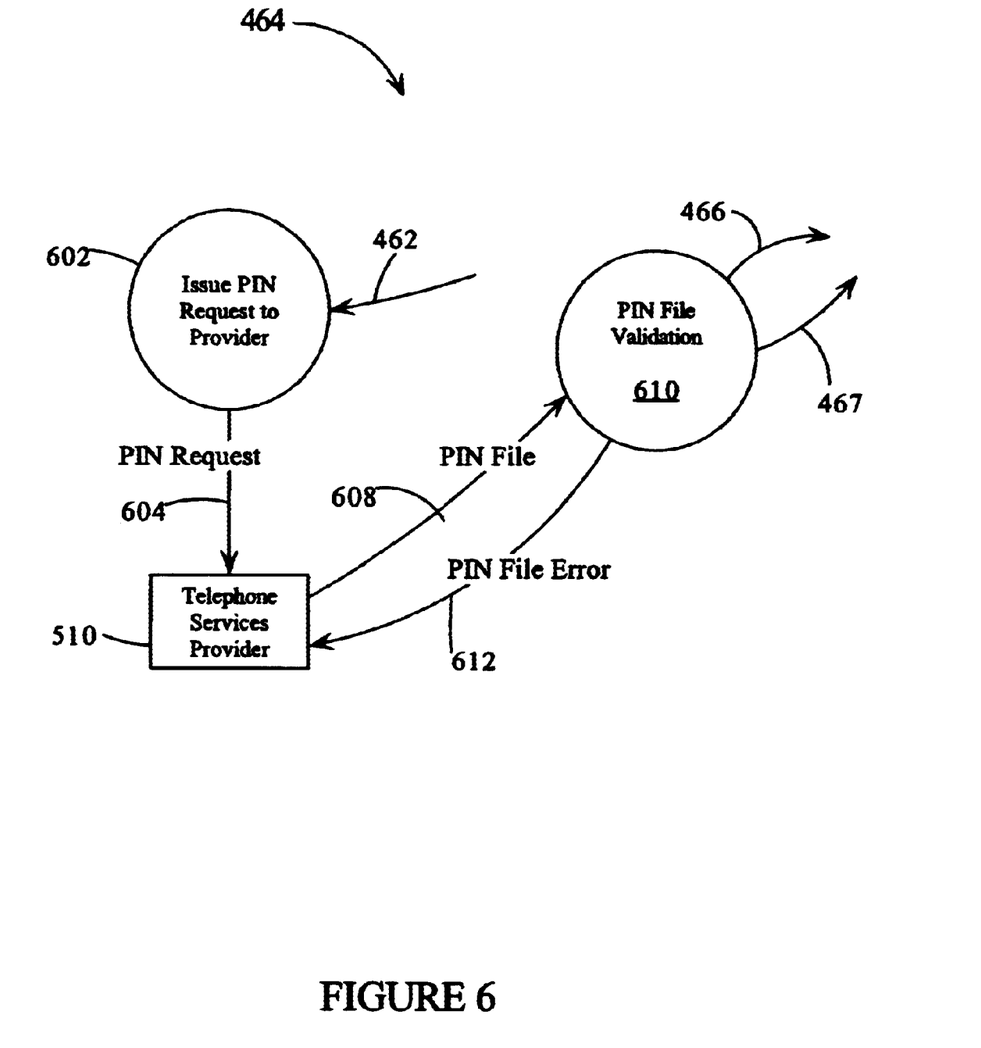
FIG. 6 illustrates, in data flow diagram form, a portion of a distribution methodology in accordance with another embodiment of the methodology of FIG. 4.

Refer now to FIG. 6 illustrating, in data flow diagram form, an alternative embodiment of PIN error handling process 464 in accordance with an alternative embodiment of the present invention. PIN error signal 462 is received by provider PIN request process 602 which issues PIN request 604 to telephone services provider 510. In response, telephone services provider 510 sends PIN file 608 to PIN file validation process 610. PIN file validation process 610 then determines whether PIN file 608 is in the proper format, as described in conjunction with FIG. 5 hereinabove. If PIN file 608 has been corrupted, PIN file validation process 610 sends a PIN file error signal 612 to telephone services provider 510. In response, telephone services provider 510 may resend a PIN file 608, which is again tested for validity by PIN file validation process 610. On receipt of a valid PIN file, PIN file validation process 610 sends valid PIN file 466 to temporary file storage 468, and issues PIN file available 467 to PIN loader 470.

Figure 7:
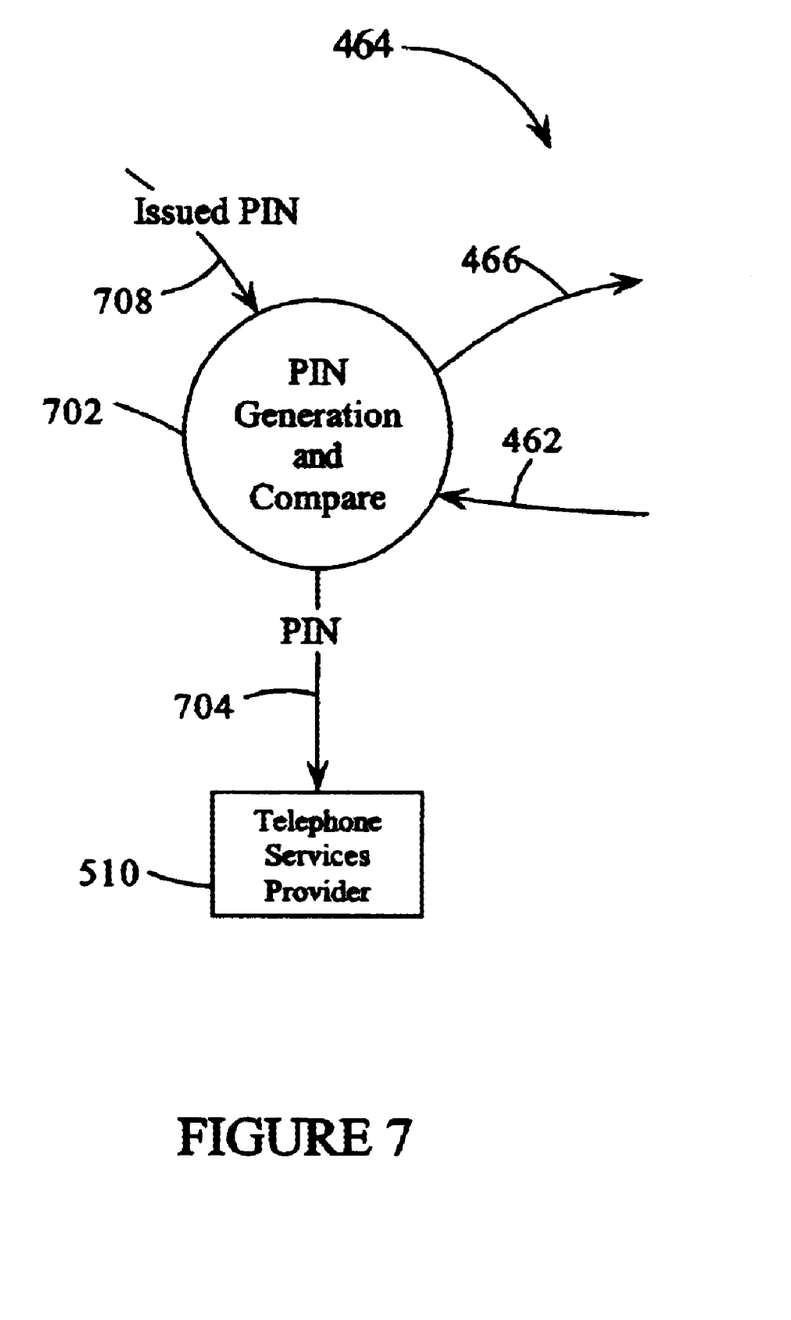
FIG. 7 illustrates, in data flow diagram form, a portion of a distribution methodology in accordance with yet another embodiment of the methodology of FIG. 4.

Referring to FIG. 7, there is illustrated, in data flow diagram form, yet another alternative embodiment of PIN error handling process 464. PIN unavailable signal 462 is received by PIN generation process 702, which generates a set of PINs and sends PIN data 704 to telecommunication services provider 510, which may then enter the PINs into its system for access accounting and access authorization. The PINs may also be sent directly to temporary storage 468 as valid PINs 466. PINs may be generated by process 702 as a random number having a predetermined plurality of digits. Process 702 also accesses PIN vault 445 by receiving issued PIN data 708 which are compared with the generated PIN in process 702, to ensure the generated PIN has not been previously issued. Moreover, in an alternative embodiment, PINs may be generated "on the fly" in which embodiment handle error process 464 is eliminated, and process 702 is merged with PIN value process 444. In this embodiment PIN value 445 receives PINs as they are generated and issued, whereby a PIN is equivalent to marked PIN 448, in FIG. 4. In this way, a generated PIN to be issued "on the fly" may be compared with the previously issued PINs to ensure against duplication, as previously described. PIN 446 is no longer received in such an embodiment, and PIN available signal 462 is also eliminated.

Figure 8:
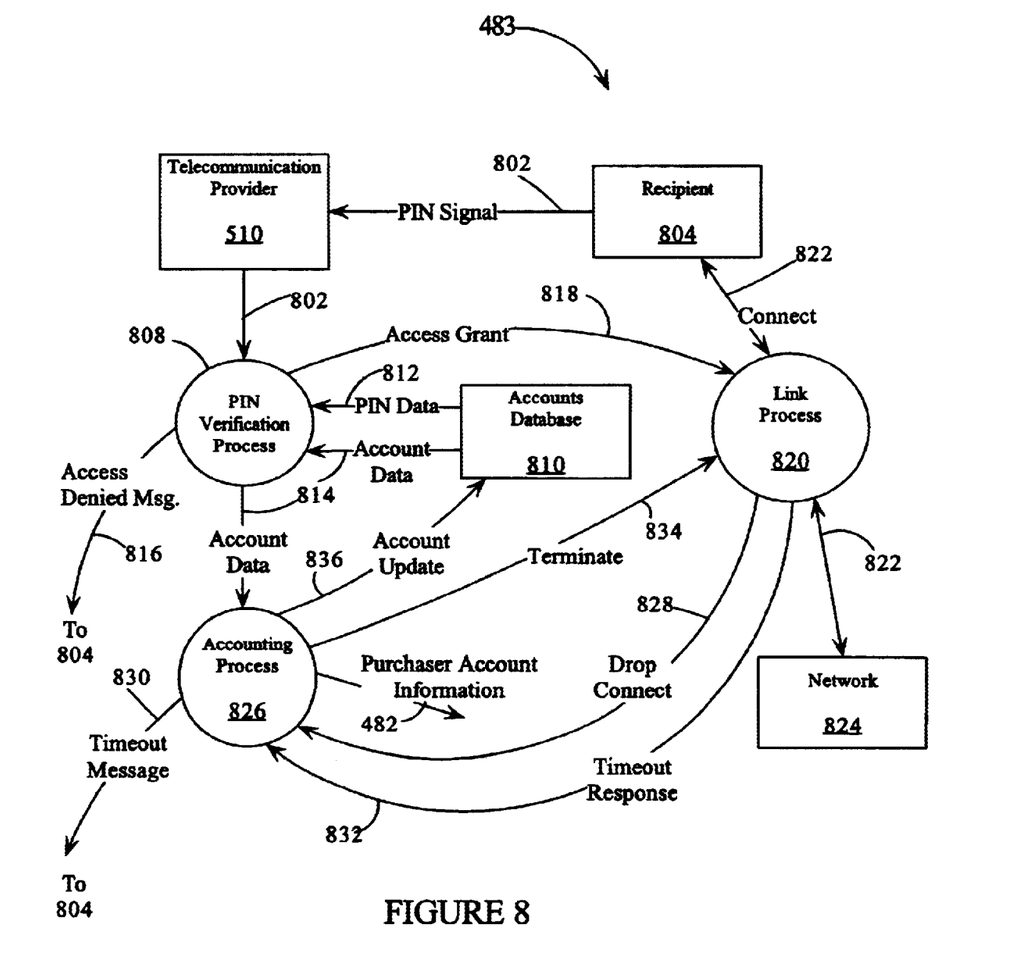
FIG. 8 illustrates, in data flow diagram form, a distribution methodology in accordance with an embodiment of the methodology of FIG. 4.

In FIG. 8, process 483 is illustrated in further detail. Provider 510 receives PIN signal 802 from recipient 804. PIN signal 802 may typically be in the form of a dual tone multi-frequency (DTMF) signal, known in the telecommunications art. Signal 802 is passed to PIN verification process 808, which determines if the PIN is valid, and if so grants access to recipient 804. Process 808 accesses accounts database 810 and compares PINs stored therein with PIN 802 (which process 808 decodes from the DTMF signals, if necessary), retrieving PIN data 812 from database 810. If PIN 802 is found in database 810, then process 808 retrieves account data 814 from database 810, and determines if a non-zero services balance remains for recipient 804. If PIN 802 is invalid or if the services balance is zero, access denied message 816 is returned to recipient 804. Message 816 may be in speech form or, alternatively, in another form, for example, a digital format, according to the type of telecommunications service acquired by recipient 804. Access denied message 816 informs recipient 804 of the reason access failed.

If, however, access may be granted, verification process 808 passes an access grant signal 816 to link process 820 which establishes connects 822 between recipient 804 and a telecommunications network 824.

Additionally, process 808 passes account data 814 to accounting process 826. Accounting process 826 includes a timer to determine an amount of service usage by recipient 804. Timing is stopped in response to a drop connect signal 828 from link process 820. Process 826 may keep a running account of remaining services and transmits timeout message 830 to recipient 804. Message 830 may include a query asking recipient if the recipient wants to renew PIN. The response may be in the form of a preselected DTMF or other signal which is detected by link process 820 and passed to accounting process 826 in timeout response 832. If the service balance becomes depleted, accounting process may issue terminate signal 834 to process 820 to inform process 820 to terminate connects 822. Otherwise, the accounting process continues until drop connect 828 is received. In either case, account information corresponding to recipient 804 is updated by accounting process 826 via account update information 836

Accounting process 826 also sends purchase account information signal 482 to notification process 480, FIG. 4. If the services balance drops below a predetermined threshold, signal 482 includes notification information signal prompting program 480 to send notification message 486, as previously discussed in conjunction with FIG. 4. Additionally, if the recipient has renewed in response to timeout message 830, account information signal 482 may include a confirmation signal portion, which may be passed by notification process 480, wherein process 480 would suppress the query in renewal notification signal 416.

Although the present invention and its advantages have been described in detail, it should be understood that various changes, substitutions and alterations can be made herein without departing from the spirit and scope of the invention as defined by the appended claims.

What is claimed is:

1. A method of delivering prepaid telecommunication services comprising the steps of:

receiving a request for a preselected amount of prepaid services from a purchaser via an electronic signal;

in response to purchaser input, receiving a payment information data signal, wherein said payment is in an amount corresponding to said preselected amount of services;

processing said payment information data to verify said data and receive payment therefrom;

electronically transmitting a personal identification number (PIN) and access instruction to a preselected recipient in response to said payment processing step, said PIN being operable for accessing said predetermined amount of prepaid services, said access instructions including a telephone number operable for accessing said prepaid telecommunication service, and wherein said transmitting step comprises:

sending a first data signal to a preselected recipient, said first signal generating a message including said PIN and said access information; and selectable sending a second data signal generating a display on a data processing system, said display having a first portion including said access information and said PIN, wherein said step of selectably sending a second data signal is performed in response to a delivery response signal from said purchaser.

2. The method as recited in claim 1 further comprising the step of:

electrically transmitting a confirmation of the purchase of said prepaid telecommunication services to said purchaser in substantially real time.

3. The method as recited in claim 2, wherein said preselected recipient is a third party.

4. The method as recited in claim 1, wherein said transmitting step comprises the steps of:

incorporating said PIN in an electronic mail signal; and sending said electronic mail signal to said preselected recipient.

5. The method as recited in claim 1, wherein said step of payment processing comprises the steps of:

receiving a payment card number signal;

initiating a verification of said payment card number; and receiving a transaction authorization in response to said initiating step.

6. The method as recited in claim 5, further comprising the steps of:

receiving said PIN from said preselected recipient by a telecommunication signal;

verifying said PIN with a database of PINs to determine the predetermined amount of the prepaid telecommunication services; and providing said prepaid telecommunication services in amount not to exceed the predetermined amount of the prepaid telecommunication services.

7. The method as recited in claim 6 further comprising the steps of:

calculating an amount used by recipient of the predetermined amount of the prepaid telecommunication services;

deducting the amount used by recipient from the predetermined amount of the prepaid telecommunication services to generate a modified predetermined amount of the prepaid telecommunication services; and updating said database of PINs to include the modified predetermined amount of prepaid telecommunication services.

8. The method as recited in claim 7 further comprising the steps of:

determining when he predetermined amount of the prepaid telecommunication services has been used to a predetermined threshold; and transmitting a signal that the predetermined amount of the prepaid telecommunication services has been used to the predetermined threshold, wherein said signal is transmitted to at least one member of the group consisting of the preselected recipient and the purchaser.

9. A system for delivery prepaid telecommunication services comprising:

circuitry operable for receiving a request for a preselected amount of prepaid services from a purchaser via an electronic signal;

circuitry operable in response to purchaser input for receiving a payment information data signal, wherein said payment is in an amount corresponding to said preselected amount of services;

circuitry operable for processing said payment information data to verify said data and receive payment therefrom;

circuitry operable for electronically transmitting a personal identification number (PIN) and access Instruction to a preselected recipient in response to said circuitry for payment processing, said PIN being operable for accessing said predetermined amount of prepaid services, said access instructions including a telephone number operable for accessing said prepaid telecommunication service, and wherein said circuitry for transmitting comprises:

circuitry operable for sending a first data signal to a preselected recipient, said first signal generating a message including said PIN and said access information; and circuitry operable for selectably sending a second data signal generating a display on a system, said display having a first portion including said access information and said PIN, wherein said circuitry for selectably sending a second data signal is performed in response to a delivery response signal from said purchaser.

10. The system as recited in claim 9 further comprises:

circuitry operable for electrically transmitting a confirmation of the purchase of said prepaid telecommunication services to said purchaser in substantially real time.

11. The system as recited in claim 10, wherein said preselected recipient is a third party.

12. The system as recited in claim 9, wherein said circuitry operable for transmitting comprises:

circuitry operable for incorporating said PIN in an electronic mail signal; and circuitry operable for sending said electronic mail signal to said preselected recipient.

13. The system as recited in claim 9, wherein said circuitry operable for payment processing comprises:

circuitry operable for receiving a payment card number signal;

circuitry operable for initiating a verification of said payment card number, and circuitry operable for receiving a transaction authorization in response to said circuitry for initiating.

14. The system as recited in claim 13 further comprises:

circuitry operable for receiving said PIN from said preselected recipient by a telecommunication signal;

circuitry operable for verifying said PIN with a database of PINs to determine the predetermined amount of the prepaid telecommunication services; and circuitry operable for providing said prepaid telecommunication services in amount not to exceed the predetermined amount of the prepaid telecommunication services.

15. The system as recited in claim 14 further comprises:

circuitry operable for calculating an amount used by recipient of the predetermined amount of the prepaid telecommunication services;

circuitry operable for deducting the amount used by recipient from the predetermined amount of the prepaid telecommunication services to generate a modified predetermined amount of the prepaid telecommunication services; and circuitry operable for updating said database of PINs to include the modified predetermined amount of prepaid telecommunication services.

16. The system as recited in claim 15 further comprises:

circuitry operable for determining when the predetermined amount of the prepaid telecommunication services has been used to a predetermined threshold; and circuitry operable for transmitting a signal that the predetermined amount of the prepaid telecommunication services has been used to the predetermined threshold, wherein said signal is transmitted to at least one member of the group consisting of the preselected recipient and the purchase.

17. A computer program product embodied in a machine readable medium for delivering prepaid telecommunication services comprising the programming steps of:

receiving a request for a preselected amount of prepaid services from a purchaser via an electronic signal;

in response to purchaser input receiving a payment information data signal, wherein said payment is in an amount corresponding to said preselected amount of services;

processing said payment information data to verify said data and receive payment therefrom;

electronically transmitting a person identification number (PIN) and access instruction to a preselected recipient in response to said payment processing step, said PIN being operable for accessing said predetermined amount of prepaid services, said access instructions including a telephone number operable for accessing said prepaid telecommunication service, and wherein said transmitting step comprises:

sending a first data signal to a preselected recipient, said first signal generating a message including said PIN and said access information; and selectably sending a second data signal generating a display on a data processing system, said display having a first portion including said access information and said PIN, wherein said step of selectably sending a second data signal is performed in response to a delivery response signal from said purchaser.

18. The computer program product as recited in claim 17 further comprises the programming step of:

electrically transmitting a confirmation of the purchase of said prepaid telecommunication services to said purchaser in substantially real time.

19. The computer program product as recited in claim 18, wherein said preselected recipient is a third party.

20. The computer program product as recited in claim 17, wherein said transmitting programming step comprises the programming steps of:

incorporating said PIN in an electronic mail signal; and sending said electronic mail signal to said preselected recipient.

21. The computer program product as recited in claim 17, wherein said programming step of payment processing comprises the programming steps of:

receiving a payment card number signal;

initiating a verification of said payment card number; and receiving a transaction authorization in response to said initiating step.

22. The computer program product as recited in claim 21 further comprises the programming steps of:

receiving said PIN from said preselected recipient by a telecommunication signal;

verifying said PIN with a database of PINs to determine the predetermined amount of the prepaid telecommunication services; and providing said prepaid telecommunication services in amount not to exceed the predetermined amount of the prepaid telecommunication services.

23. The computer program product as recited in claim 22 further comprises the programming steps of:

calculating an amount used by recipient of the predetermined amount of the prepaid telecommunication services;

deducting the amount used by recipient from the predetermined amount of the prepaid telecommunication services to generate a modified predetermined amount of the prepaid telecommunication services; and updating said database of PINs to include the modified predetermined amount of prepaid telecommunication services.

24. The computer program product as recited in claim 23 further comprises the programming steps of:

determining when the predetermined amount of the prepaid telecommunication services has been used to a predetermined threshold; and transmitting a signal that the predetermined amount of the prepaid telecommunication services has been used to the predetermined threshold, wherein said signal is transmitted to at least one member of the group consisting of the preselected recipient and the purchaser.

25. A method for delivering prepaid telecommunication services comprising the steps of:

receiving a request for a preselected amount of prepaid services from a purchaser via an electronic signal;

in response to purchaser input, receiving a payment information data signal, wherein said payment is in an amount corresponding to said preselected amount of services;

processing said payment information data to verify said data and receive payment therefrom; and electronically transmitting a personal identification number (PIN) and access instruction to a preselected recipient in response to said payment processing step, said PIN being operable for accessing said predetermined amount of prepaid services, said access instructions including a telephone number operable for accessing said prepaid telecommunication service and wherein said transmitting step comprises:

sending a first data signal generating display on a data processing system, said display having a first portion including access information and said PIN; and selectably sending a second data signal to said preselected recipient, said second signal generating a message including said PIN and said access information, wherein said step of sending said second data signal is performed in response to a delivery response signal from said purchaser.

* * * * *

UNITED STATES PATENT AND TRADEMARK OFFICE
CERTIFICATE OF CORRECTION

PATENT NO. : 6,628,766 B1 Page 1 of 1
DATED : September 30, 2003
INVENTOR(S) : Nicolas Stanley Ashworth Hollis and John Rex Powell It is certified that error appears in the above-identified patent and that said Letters Patent is hereby corrected as shown below:

Column 10,
Line 65, please replace "selectable" with -- selectably --.

Signed and Sealed this

Twenty-second Day of June, 2004

JON W. DUDAS
*Acting Director of the United States Patent and Trademark Office*